Oct. 16, 1962  A. E. PLÈGAT  3,058,649
SYNCHRONOUS OSCILLATING COMPRESSOR ACTUATED
BY AN ALTERNATING MAGNETIC FIELD
Filed March 3, 1961

INVENTOR

ALAIN E. PLÈGAT

*Imirie & Smiley*
Attys.

3,058,649
SYNCHRONOUS OSCILLATING COMPRESSOR ACTUATED BY AN ALTERNATING MAGNETIC FIELD
Alain Edouard Plègat, Asnieres, Seine, France, assignor to Societe Anonyme des Usines Chausson, Asnieres, Seine, France, a company of France
Filed Mar. 3, 1961, Ser. No. 93,204
Claims priority, application France Mar. 3, 1960
3 Claims. (Cl. 230—55)

The present invention relates to a synchronous oscillating compressor actuated by an alternating magnetic field, characterized in that the magnetic circuit of this compressor comprises at least one annular permanent magnet whose radial magnetic field causes north and south polarities respectively to appear on the lateral external and internal surfaces. Permanent magnets of this type, which have only been recently made, enable a compressor to be produced occupying small space whose very simplified embodiment enables a much lower cost price to be obtained than with known compressors of the same power.

According to the invention, the compressor comprises a rod guided in a seal-tight chamber and subjected to the action of opposing elastic members, for the alternating drive of at least one piston associated with a cylinder, this rod being integral with a soft iron core placed coaxially in a cylindrical magnetic circuit maintaining the vibrations of said rod, a circuit essentially comprising at least one permanent magnet of ring shape whose magnetic field is radial, then two excitation coils placed on either side of this magnet and supplied with alternating current, these coils, the magnet and two foliated end washers being engaged, without clearance in the cylindrical magnetic cover of the chamber.

Various other characteristics of the invention will moreover be revealed by the detailed description which follows.

A form of embodiment of the purpose of the invention is shown, by way of example, in the attached drawing.

Figure 1:
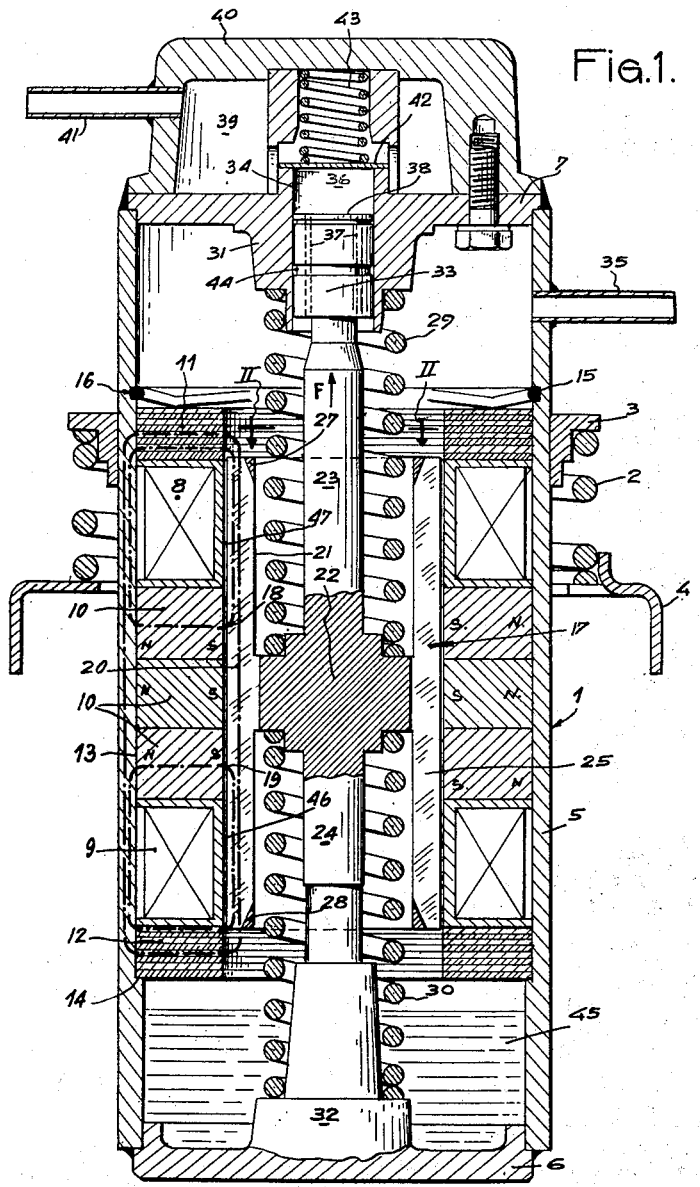
FIGURE 1 is a longitudinal section of a compressor according to the invention.
Figure 2:
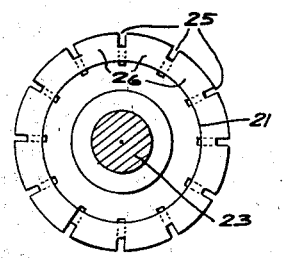
FIGURE 2 is a plane view taken along the line II—II of FIGURE 1, showing an element of the compressor.

The compressor properly so called is placed in a chamber 1 elastically maintained by means of a spring 2 bearing on a small collar 3 integral with the chamber, by a fixed frame 4, of sheet iron, for example. The chamber consists of a tubular casing 5 closed at its ends by a bottom 6 and a cover 7, welded for ensuring the seal-tightness of this chamber. Two excitation coils 8 and 9 wound in the same direction, are interposed between the permanent magnets 10 of ring shape and the end foliated washers 11 and 12. The magnets, coilings and washers are engaged without clearance in a bore 13 made in a casing 5 and secured against a shoulder-piece 14 of the latter by an elastic part 15 housed in a groove 16 of said casing.

According to the invention, the annular magnets 10 are characterized in that the permanent magnetic field that they set up is radial, so as to cause a north polarity to appear on the external lateral surface of the ring, and a south polarity on the internal lateral surface. In the example shown, three magnets of this type are piled one on the other for the sole purpose of making the height of the cylindrical polar surfaces sufficient, because the height of annular magnets, as made industrially at present, is limited.

The assembly formed by the magnets 10, the washers 11 and 12 and the envelope of the coilings 8 and 9 is bored with accuracy, so as to enable the free axial displacement of a core or shuttle 17 with a minimum airgap.

The magnetic flows set up by the permanet magnets 10 close along the pathways 18 and 19 in each radial plane of the magnetic circuit formed by these magnets, the casing 5, the washers 11, 12 and the core 17. The balance position of the latter in said permanent magnetic field is that for which the magnetic resistances of circuits 18 and 19 are equal, which condition is obtained when the core 17 assumes the middle position shown in FIGURE 1.

The coilings 8 and 9, surrounding the core 17, are supplied with alternating current so as to set up an alternating magnetic flux traversing the magnetic circuit along the pathway 20 in each radial plane.

The shuttle 17 has the general shape of a tube 21 extending on either side of a thick disc 22 which is moreover integral with rods 23 and 24 placed coaxially in this tube. Slots 25 are countersunk radially in the tube 21, so as to delimit longitudinal small tongues 26 in the core which, in order to avoid losses, canalize the lines of force of the permanent magnetic field on which the alternating magnetic field is superimposed. These small tongues are however connected together by the disc 22 and end crowns 27 and 28 provided in the tube. Helicoidal springs 29 and 30 slipped on to the rods 23 and 24, are interposed between the disc 22 and bosses 31 and 32, respectively formed projecting under the cover 7 and on the bottom 6.

The shuttle 17 and its rods 23, 24 form a mobile assembly whose oscillating movement, created by the two opposing springs 29 and 30, is electromagnetically maintained by the magnetic circuit with reference to the guide marks 8 to 1.

The rods 23 and 24 must normally be accurately guided in the bosses 31 and 32. As shown in FIGURE 1, the guiding of the rod 23 is effected in the following manner: the latter is integral with a smooth piston 33 so placed as to be able to slide in a cylinder 34 bored in the boss 31. This cylinder emerges at one of its ends, in the chamber 1 filled with fluid for compressing, because it communicates by piping 35 with the low pressure circuit of an installation in which this compressor is put into operation. The compression chamber 36, delimited by the cylinder 34, communicates with the chamber: through holes 37 drilled in the piston 33, under the control of an inlet disc-valve associated with the latter.

The other end of the cylinder 34 emerges in a cavity 39 cut in a cylinder head 40 extended with seal-tightness on the cover 7, this cavity communicating, by means of piping 41, with the high pressure circuit of the installation. The communication between the chamber 36 of the cylinder and the cavity 39 is controlled by a delivery disc-valve 42, elastically maintained, by means of a spring 43, by the cylinder head 40.

The piston 33 and cylinder 34 form, with the members connected therewith, a first compression stage for the fluid. It will be easily seen that the guiding of the rod 24 in the boss 32 can be effected in the same way, i.e., by means of a piston, for forming a second compression stage. In this case, the fluid compressed in the chamber can be delivered, through the rods 23 and 24, into the cylinder of this second stage from which the fluid, compressed again, is directed towards the high pressure circuit of the installation.

The lubrication of the cylinder 34 must be very carefully carried out; a duct (not shown), can be delimited by the rods 23 and 24 for connecting a peripheric groove 44 cut in the piston 33, to a pump which is housed in the boss 32, if this compressor comprises only one compression stage. It might be advantageous to use a piston pump, the latter being integral with the rod 24 for moving in a cylinder delimited by the afore-mentioned boss, so as also to effect the guiding of this rod. The pump sucks in the lubricant 45 contained in the chamber 1 and delivers it in small quantities, into the groove 44 for forming a permanent film between the piston and the cylinder 34. It is quite obvious that the pump must be so devised as to avoid any fluid damping of the oscillating movement of the shuttle 17.

In order still further to simplify the construction of this compressor, it might be advantageous to extend in the bosses 31 and 32 sleeves of sintered bronze impregnated with a self-lubricating plastic material, such as that known usually in the trade as "Teflon." These sleeves could form either a compression cylinder in which a piston integral with the corresponding rod 23 or 24 moves, or a guiding ring for the other rod.

The operating of the compressor described above takes place in the following manner:

When not working, the core 17 occupies the middle position, shown in FIGURE 1, for which the magnetic circuits 18 and 19 have magnetic resistances equal between them. When the coilings 8 and 9 are supplied with alternating current, they set up a flux in the core 17 which closes across the magnetic circuits 5, 11 and 12 along the pathway 20. This alternating electromagnetic flux changes direction twice per period, and, for each half-period, it superimposes the permanent magnetic flow of the circuits 18 and 19 which are in the opposite direction to the level of the airgaps 46 and 47. These fluxes add themselves algebraically, so that the resulting flux which, during a half-period of supply current is maximum opposite the coil 8, for example, is minimum opposite the coil 9, and that, during the following half-period, this resulting flux becomes minimum opposite the coil 8 and maximum opposite the coil 9. The core 17 tends to move towards the maximum flux, resulting in the mobile assembly being maintained, by this alternating electro-magnetic device, in a rectilinear oscillating movement set up by the springs 29, 30, a movement whose frequency is equal to that of the alternating supply current for said device.

For the semi-period during which the mobile assembly moves in the direction of the arrow F, the piston 33 compresses the fluid contained in the chamber 36 of the cylinder 34, which has, on the one hand, the effect of closing the inlet valve 38, and, on the other, of opening the delivery valve 42. The compressed fluid penetrates into the cavity 39 of the cylinder head 40 and flows, through the piping 41 towards the high pressure circuit of the installation.

For the half-period during which the mobile assembly moves in the opposite direction to the arrow F, the piston 33 sets up a depression in the chamber 36 of the cylinder 34 which tends still further to close the delivery valve 42 and open the suction valve 33. Communication is thus set up by the holes 37 between the chamber 1 containing the fluid to be compressed and the chamber 36 which fills. At each new period this cycle is repeated.

Various modifications can moreover be applied to the form of embodiment, shown and described in detail, without going outside of the scope of the invention.

I claim:

1. An electromagnetically reciprocating fluid compressor comprising an outer cylindrically shaped magnetic metal casing, caps closing both ends of said casing to delimit a sealed housing except for a fluid inlet and a fluid outlet provided in said casing and caps, at least one annular radially magnetized permanent magnet inserted inside said housing in peripheral engagement therewith and located at the middle portion thereof, two ring shaped coil windings inserted in said housing and respectively located on both sides of said annular magnet and in close proximity therewith, two stacks of magnetic metal washers respectively located inside said housing on both sides of said coil windings, means to press together said stacks of washers, said coil windings and said annular magnet for securing them to the casing, said washers, coil windings and magnet further delimiting a cylindrical bore of constant diameter, a cylindrically shaped magnetic armature inserted in said cylindrical bore, said armature having an nular outer portion of magnetic material and an axially extending rod and a disc shaped member connecting said annular portion and said rod, said magnetic annular portion further having a length chosen to extend between the ends of said coil windings which bear on said stacks of washers, internally protruding elements provided at the central portion of said caps closing said casing, said protruding elements having axially directed bores into which said rod of the armature is slidably engaged for guiding thereof, a cylinder formed in one of said bores, a piston secured to one of the ends of said rod for reciprocating in said cylinder, duct means for admitting fluid into and out of said cylinder, and valve means cooperating with said duct means to admit fluid into the cylinder and control flow of compressed fluid out of the cylinder to said fluid outlet.

2. An electromagnetically reciprocating fluid compressor comprising an outer cylindrically shaped magnetic metal casing, caps closing both ends of said casing delimiting a sealed housing except for a fluid inlet and a fluid outlet provided in said casing and caps, at least one annular radially magnetized permanent magnet inserted inside said housing in close peripheral engagement therewith and located at the middle portion thereof, two ring shaped coil windings inserted in said housing and respectively located on both sides of said annular magnet and in close proximity thereto, two stacks of magnetic metal washers respectively located inside said housing on both sides of said coil windings, means to press together said stacks of washers, said coil windings and said annular magnet for securing them to said casing, said washers, coil windings and magnet further delimiting a cylindrical bore of constant diameter, a cylindrically shaped magnetic armature inserted in said cylindrical bore and spaced therefrom by a small airgap, said magnetic armature comprising an axial rigid rod provided with a piston at least at one of its ends and with a disc member at its middle portion connecting the rod to cylindrical portion of the armature, said armature cylindrical portion being formed of small tongues integral with said disc member and extending axially at its periphery on both sides therefrom, said small tongues being made of magnetic material and being further integral on both ends with connecting crowns, the length of said small tongues being determined so that they extend between the ends of said coil windings which bear on said stacks of washers, inwardly protruding elements provided at the central portions of said caps closing said casing, said protruding elements having axially directed bores into which said rod ends are slidably engaged for guiding thereof together with said armature, at least one cylinder provided one of said caps for a fluid to be compressed by said piston reciprocated by the armature, duct means for permitting flow of fluid into and out of said cylinder, and valve means cooperating with said duct means to admit fluid into the cylinder and control flow of compressed fluid out of the cylinder to said fluid outlet.

3. An electromagnetically reciprocating fluid compressor as set forth in claim 2 in which further said disc member of the armature is provided on both sides with shoulders and said protruding portions of the caps closing the casing are provided with shoulders corresponding to said shoulders of the disc member, and two compression springs fitted about said rod of the armature and respectively inserted between the shoulders of the disc member and the shoulders of the protruding portions of said caps.

References Cited in the file of this patent
UNITED STATES PATENTS
2,721,453   Reutter _____ Oct. 25, 1955